(12) United States Patent
Thomas et al.

(10) Patent No.: US 8,353,621 B2
(45) Date of Patent: Jan. 15, 2013

(54) BOWL COOLING JACKET FOR MIXERS

(75) Inventors: Douglas Thomas, Fort Loramie, OH (US); Eric Weatherhead, Sidney, OH (US); Josh Ludwig, Sidney, OH (US); Michael W. Hall, Sidney, OH (US)

(73) Assignee: Shaffer Manufacturing Corp., Urbana, OH (US)

( * ) Notice: Subject to any disclaimer, the term of this patent is extended or adjusted under 35 U.S.C. 154(b) by 557 days.

(21) Appl. No.: 12/567,945

(22) Filed: Sep. 28, 2009

(65) Prior Publication Data

US 2010/0124144 A1  May 20, 2010

Related U.S. Application Data

(60) Provisional application No. 61/116,135, filed on Nov. 19, 2008.

(51) Int. Cl.
  *B01F 15/06* (2006.01)
(52) U.S. Cl. .......................... 366/149; 165/169
(58) Field of Classification Search .................. 366/149; 165/168–171
See application file for complete search history.

(56) References Cited

U.S. PATENT DOCUMENTS

| | | | | |
|---|---|---|---|---|
| 1,726,458 | A | * | 8/1929 | Tellander ...................... 165/170 |
| 2,274,220 | A | | 2/1942 | Sticelber |
| 2,415,711 | A | | 5/1943 | Sticelber |
| 2,504,465 | A | | 9/1945 | Sticelber |
| 3,310,106 | A | * | 3/1967 | Leseelleur et al. ............ 165/169 |
| 4,002,200 | A | * | 1/1977 | Raskin .......................... 165/131 |
| 4,159,740 | A | | 7/1979 | Seiling |
| 4,275,568 | A | | 6/1981 | Zielsdorf |
| 6,021,816 | A | | 2/2000 | Jeltsch et al. |
| 6,047,558 | A | | 4/2000 | Hall |
| 2008/0151682 | A1 | | 6/2008 | Fay et al. |

\* cited by examiner

*Primary Examiner* — David Sorkin
(74) *Attorney, Agent, or Firm* — McNees Wallace & Nurick, LLC

(57) ABSTRACT

A cooling jacket for use with mixing bowls typically incorporated into industrial mixers is provided. This cooling jacket includes plurality of substantially parallel coolant channels formed from the material of the jacket, wherein each of the plurality of channels further includes a least one vertical portion and at least one horizontal portion, and wherein each horizontal portion further includes a plurality of parallel ridges and parallel valleys formed therein and running lengthwise therethrough.

13 Claims, 9 Drawing Sheets

BOWL COOLING JACKET FOR MIXERS

CROSS-REFERENCE TO RELATED APPLICATIONS

This patent application claims the benefit of U.S. Provisional Patent Application Ser. No. 61/116,135 filed on Nov. 19, 2008 and entitled "Bowl Cooling Jacket," the disclosure of which is hereby incorporated by reference herein in its entirety and made part of the present U.S. utility patent application for all purposes.

BACKGROUND OF THE INVENTION

The described invention relates in general to a system and apparatus for mixing viscous substances such as dough, and more specifically to a cooling jacket incorporated into the mixing bowl component of industrial mixers for controlling the temperature of the substance being mixed during the mixing process.

Friction and viscous shear encountered during mixing typically causes a temperature rise in a substance being mixed. This temperature rise becomes more severe as mixing speed increases and can adversely affect production by making the substance sticky and difficult to process. Accordingly, mixers, particularly dough mixers, are most effective when equipped with some type of temperature control means, whereby the temperature of the substance to be mixed may be stabilized at a predetermined level or maintained below a predetermined threshold. For example, bread dough should be mixed at a temperature of about 78-80° F. A known means for controlling the temperature of a substance being mixed is through the use of a refrigeration jacket attached to the mixing bowl component of a mixer. Bowl refrigeration jackets, also referred to as "cooling jackets" usually include multiple coolant channels that are arranged perpendicular to the ends of a mixing bowl, and which are arrayed around the profile of the mixing bowl. Additional coolant channels may be optionally included on the ends of the mixing bowl.

Large commercial scale dough mixers may be manufactured both with and without mixing bowl cooling jackets based primarily on the type and quantity of dough to be mixed. Dough mixers manufactured with bowl cooling jackets are categorized as having either "indirect" or "direct" cooling. An indirect refrigeration system utilizes cold water, glycol, or brine as a cooling fluid. This cooling fluid is first chilled by a compressed refrigerant system separate from the mixer, and is then pumped to the mixer. The cooling fluid then circulates through the mixing bowl's cooling jacket, which is typically comprised of a series of parallel channels fastened directly to the exterior of the mixing bowl. Heat generated during the mixing process is transferred from the dough, through the material of the mixing bowl, and then into the cooling fluid. After the mixing process is complete, the cooling fluid is then piped back to a storage tank for reuse. This principle may be applied to a "direct" refrigeration system, as well. A direct expansion refrigeration system introduces refrigerant directly into the refrigeration jacket of a mixer to remove excess heat from the dough being mixed. This type of cooling system typically includes a compressor, a condenser, an evaporator, and a receiver. The bowl refrigeration jacket serves as the evaporator in this configuration and the types of refrigerants used in this configuration typically include R134a and MP-39.

With regard to the commercial mixing systems, during a typical mixing cycle, doughs or other viscous materials approaching 3000 pounds are mixed at speeds approaching 100 rpm. The movement of the material being mixed within the mixing bowl creates tremendous force, which is directed outward in a direction perpendicular to the orientation of the bowl sheet component of a mixing bowl. As a reaction to these forces, the bowl sheet will repeatedly expand and contract, temporarily altering the profile of the bowl sheet. Known systems utilize heavily reinforced bowl cooling jackets to overcome this bowl sheet deflection. Because cooling jackets are usually rigidly attached to the bowl sheet components of mixers to provide sealed channels for coolant passage, the welded points of attachment between channels of the cooling jacket and the bowl sheet are subjected to cyclical stress concentrations. Over time, these stress concentrations result in fatigue at the attachment points and ultimately in the failure of the cooling jacket. Thus, there is a need for a bowl refrigeration or cooling jacket, the design of which reduces the stress and fatigue experienced at the welded points of attachment between the channels of a cooling jacket and the bowl sheet to which it is attached.

SUMMARY OF THE INVENTION

The following provides a summary of the present invention. This summary is not an extensive overview and is not intended to identify key or critical aspects or elements of the present invention or to delineate its scope.

In accordance with one aspect of the present invention, a mixing system for use with viscous substances such as dough is provided. This system includes a mixing apparatus and a mixing bowl mounted within the mixing apparatus. The mixing bowl further includes a metal bowl sheet and a metal cooling jacket mounted to the bowl sheet. The cooling jacket further includes a plurality of metal channels forming structures running parallel to one another across the length of the bowl sheet. Each of the plurality of channel forming structures further includes a least one vertical portion relative to the surface of the bowl sheet and a horizontal portion relative to the surface of the bowl sheet. Each horizontal portion further includes a plurality of parallel ridges and parallel valleys formed therein and running lengthwise therethrough. This system also includes a source of coolant in fluid communication with the cooling jacket for reducing the temperature of a viscous substance being mixed during the mixing process.

In accordance with another aspect of the present invention, a mixing bowl for use with industrial or commercial mixing systems is provided. This mixing bowl includes a bowl sheet; and a cooling jacket mounted directly on the bowl sheet. The cooling jacket further includes a plurality of channel forming structures running parallel to one another across the length of the bowl sheet. Each of the plurality of channel forming structures further includes a least one vertical portion relative to the surface of the bowl sheet and a horizontal portion relative to the surface of the bowl sheet. Each horizontal portion further includes a plurality of parallel ridges and parallel valleys formed therein and running lengthwise therethrough.

In yet another aspect of this invention, a cooling jacket for use with the type of mixing bowls typically incorporated into industrial mixers is provided. This cooling jacket includes plurality of substantially parallel coolant channels formed from the material of the jacket, wherein each of the plurality of channels further includes a least one vertical portion and at least one horizontal portion, and wherein each horizontal portion further includes a plurality of parallel ridges and parallel valleys formed therein and running lengthwise therethrough.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Figure 1:
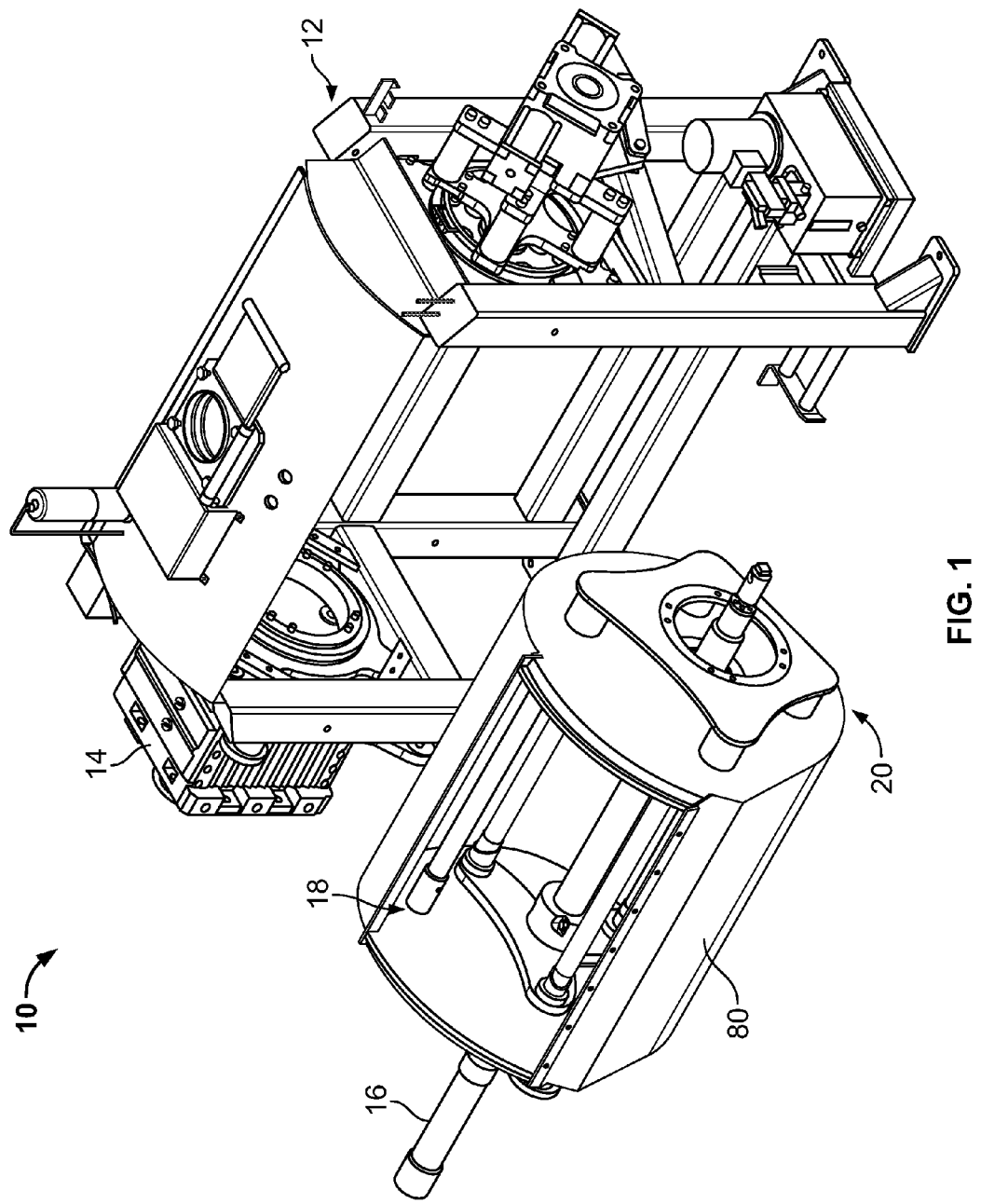
FIG. 1 provides an illustration of an exemplary mixing apparatus wherein the mixing bowl component has been removed from the apparatus.

Exemplary embodiments of the present invention are now described with reference to the Figures. Reference numerals are used throughout the detailed description to refer to the various elements and structures. Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

The present invention relates to industrial mixers for mixing dough and other similar viscous substances and materials which experience a problematic temperature rise during the mixing process. A first general embodiment of this invention provides a mixing system for use with viscous substances such as flour-based dough. A second general embodiment of this invention provides a mixing bowl for use with industrial or commercial mixing systems. A third general embodiment of this invention provides a cooling jacket for use with the type of mixing bowls typically incorporated into industrial mixers. With reference now to the Figures, one or more specific embodiments of this invention shall be described in greater detail.

Figure 2A:
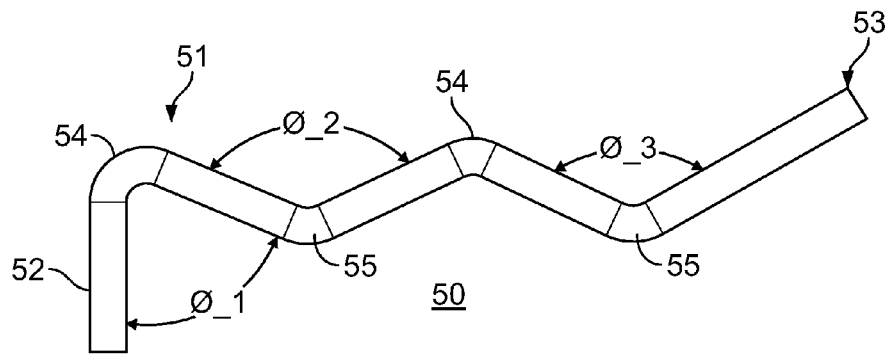
FIG. 2a provides a cross-sectional view of an exemplary embodiment of the bowl cooling jacket of the present invention showing the vertical and horizontal portions of one of the single-break coolant channels of the bowl cooling jacket.
Figure 2B:
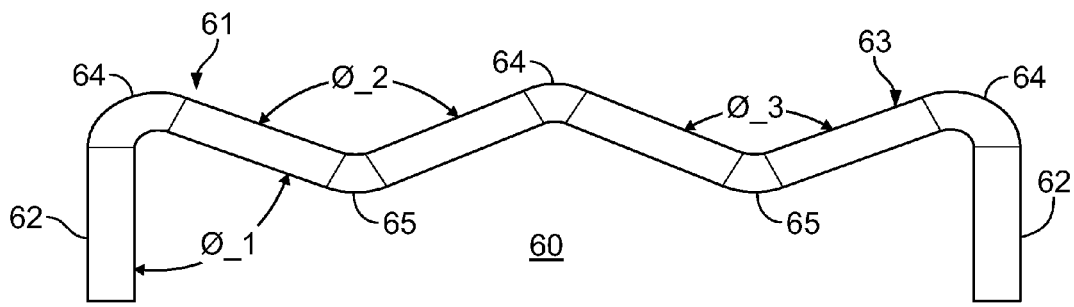
FIG. 2b provides a cross-sectional view of an exemplary embodiment of the bowl cooling jacket of the present invention showing the vertical and horizontal portions of one of the double-break coolant channels of the bowl cooling jacket.
Figure 2C:
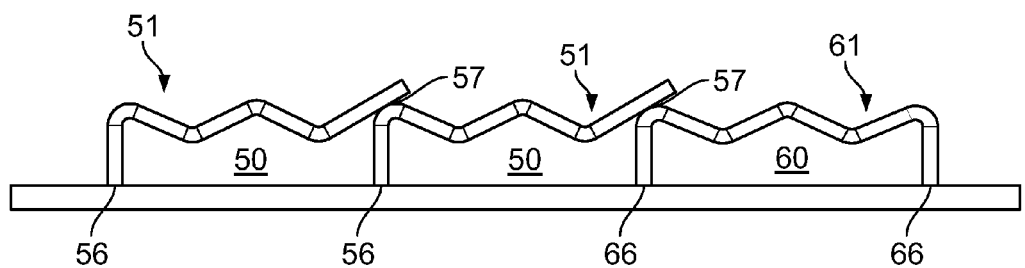
FIG. 2c provides a cross-sectional view of an exemplary embodiment of the bowl cooling jacket of the present invention showing one possible configuration of multiple coolant channels arranged on the bowl sheet.

As shown in FIG. 1, an exemplary mixing apparatus 10 includes frame 12, gear motor 14, drive shaft 16, agitator assembly 18, and mixing bowl 20, the exterior of which is covered with wrapper sheet 80. With reference to FIGS. 2a-c, 3a-d and 4a-d, mixing bowl 20 further includes bowl sheet 30, upon which bowl cooling jacket 40 is mounted and/or constructed. Bowl cooling jacket 40 further includes a plurality of individual channel forming structures 51 and 61 that are mounted on the surface of bowl sheet 30 and through which liquid coolant flows when mixing apparatus 10 is in use. As best shown in FIGS. 2a-c, these structures may be characterized as "single break" (51) or "double break" (61) channel forming structures. FIG. 2a provides a cross-sectional view of single break channel forming structure 51, which forms coolant channel 50 when attached to bowl sheet 30. Channel forming structure 51 includes a vertical portion 52 and a substantially horizontal portion 53. Horizontal portion 53 is contoured and includes a plurality of parallel peaks or ridges 54 and a plurality of parallel depressions or valleys 55. As shown in FIG. 2c, channel forming structures 51 are attached to bowl sheet at weld joints 56 and to each other at weld joints 57. FIG. 2b provides a cross-sectional view of double break channel forming structure 61, which forms coolant channel 60 when attached to bowl sheet 30. Channel forming structure 61 includes vertical portions 62 and a substantially horizontal portion 63. Horizontal portion 63 is contoured and includes and includes a plurality of peaks ridges 64 and a plurality of depressions or valleys 65. As shown in FIG. 2c, channel forming structures 61 are attached to bowl sheet at weld joints 66. As will be appreciated by the skilled artisan, channel forming structures 51 and 61 are typically preformed using known fabrication methods prior to being attached to bowl sheet 30.

Figure 3A:
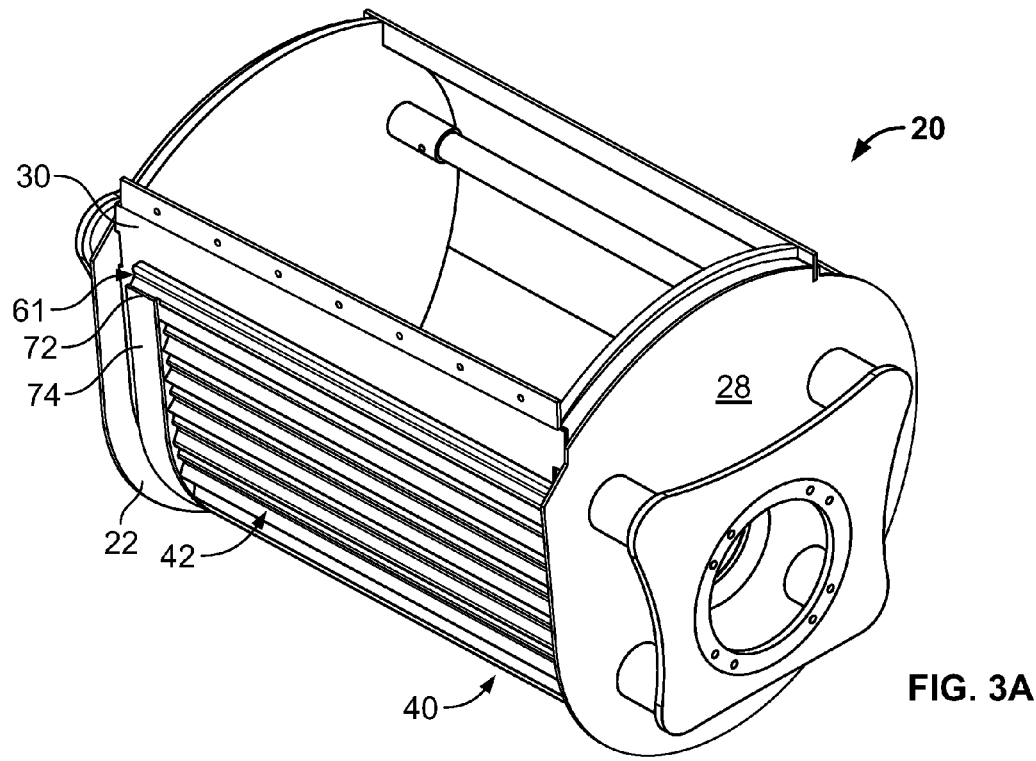
FIG. 3a is a perspective view of an exemplary embodiment of the bowl cooling jacket of the present invention showing the front portion of the bowl cooling jacket attached to the front portion of the bowl sheet.
Figure 3B:
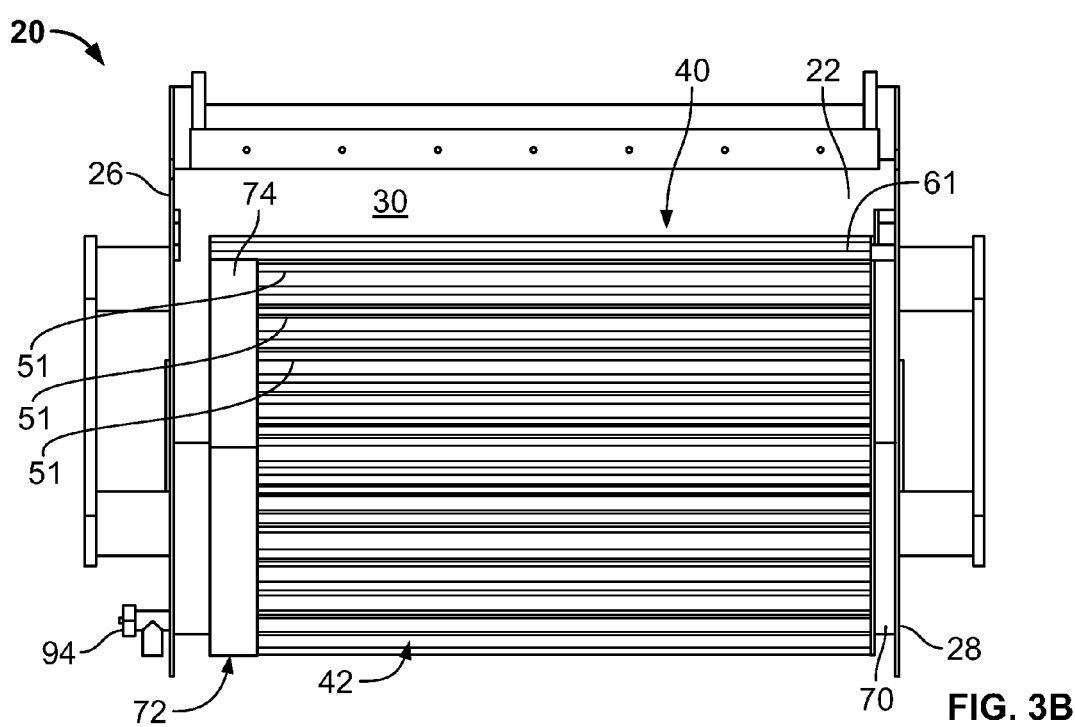
FIG. 3b is a side view of an exemplary embodiment of the bowl cooling jacket of the present invention showing the front portion of the bowl cooling jacket attached to the front portion of the bowl sheet.
Figure 3C:
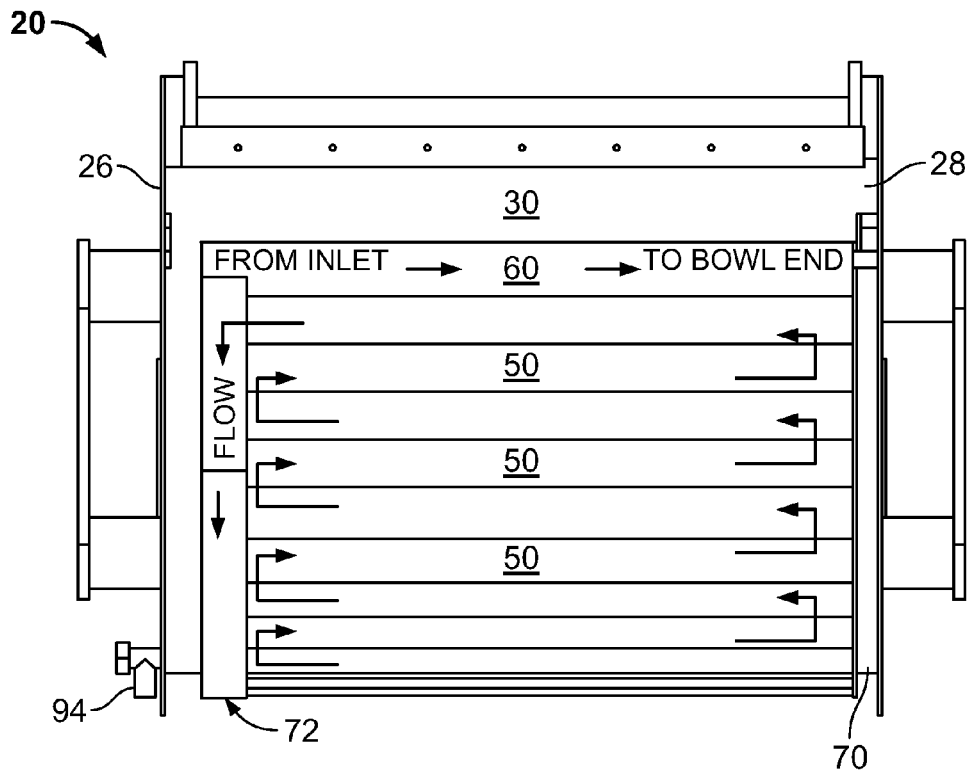
FIG. 3c is a side view of an exemplary embodiment of the bowl cooling jacket of the present invention showing the front portion of the bowl cooling jacket with the top portions thereof removed to reveal individual coolant channels and to indicate the directional flow of liquid coolant through these channels.
Figure 3D:
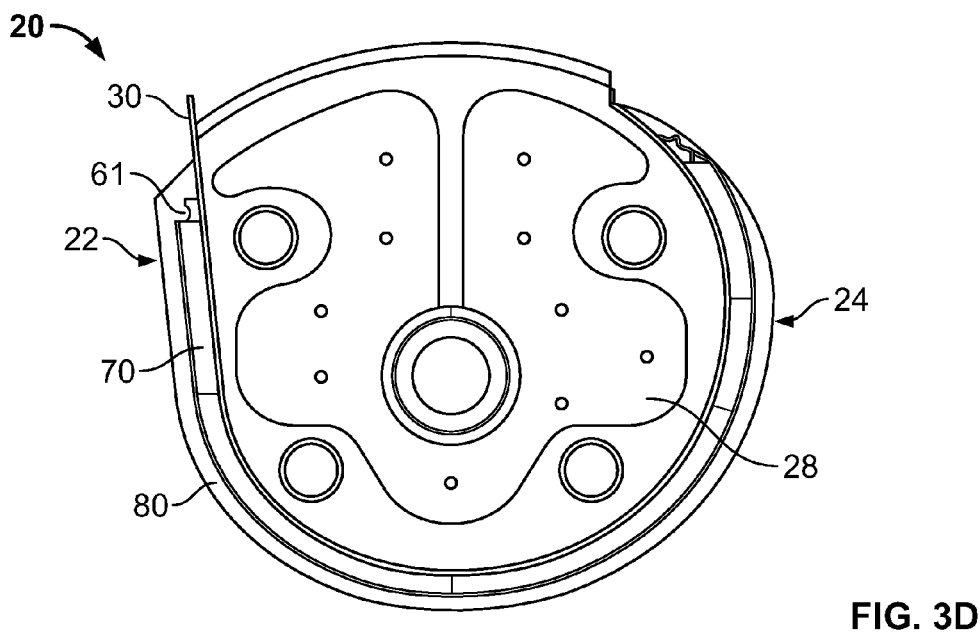
FIG. 3d is an end view of an exemplary embodiment of the mixing bowl of the present invention.

With reference to FIGS. 3a-d, 4a-d, and 6a-c, mixing bowl 20 includes a front portion 22, a rear portion 24, a left end 26 and a right end 28. Bowl sheet 30 is a substantially U-shaped piece of material, typically stainless steel, that houses agitator assembly 18 and that contains a quantity of material to be mixed, typically flour-based dough, when mixing apparatus 10 is in use. As previously described, bowl cooling jacket 40 includes a plurality of individual channels through which liquid coolant flows for the purpose of controlling the temperature of the contents of mixing bowl 20, when in use. FIGS. 3a-b and 4-ab illustrate an exemplary embodiment of the bowl cooling jacket 40, wherein the front portion 42 of bowl cooling jacket 40 includes at least one channel forming structure 51, which is in fluid communication with a plurality of parallel channel forming structures 61. Rear portion 44 of bowl cooling jacket includes a plurality of channel forming structures 61, which are also in fluid communication with one another and with the channel forming structures on front portion 42. As shown in the Figures, channel forming structures 51 and 61 run parallel to one another across the surface of bowl sheet 30. Jacket side rail 70 runs perpendicular to channel forming structures 51 and 61 across the surface of one end bowl sheet 30 and seals the ends of the channels (50, 60) formed by structures 51 and 61. Jacket return channel 72 also runs perpendicular to channel forming structures 51 and 61 across the surface of the opposite end of bowl sheet 30 and provides a path for liquid coolant to flow from front portion 42 of bowl cooling jacket 40 to rear portion 44 of bowl cooling jacket 40. Jacket return channel 72 is typically constructed of two jacket side rails 70 that are sealed with cover 74. By providing a path for liquid coolant to flow from front portion 42 to rear portion 44, jacket return channel 72 facilitates the placement of both refrigerant inlet port 90 and refrigerant outlet port 92 on left end 26 of mixing bowl 20 (see FIGS. 4a and 4d). An exemplary flow path of liquid coolant through mixing bowl 20 and bowl cooling jacket 40 is illustrated in FIGS. 3c-d, 4c-d, and 5. Other configurations are possible and in alternate embodiments, refrigerant inlet port 90 and refrigerant outlet port 92 are placed on opposite ends of mixing bowl 20, rather than on the same end thereof. In still other embodiments, liquid coolant flows across and through ends 26 and 28 for the purpose of enhancing the cooling effect of bowl cooling jacket 40.

Figure 4A:
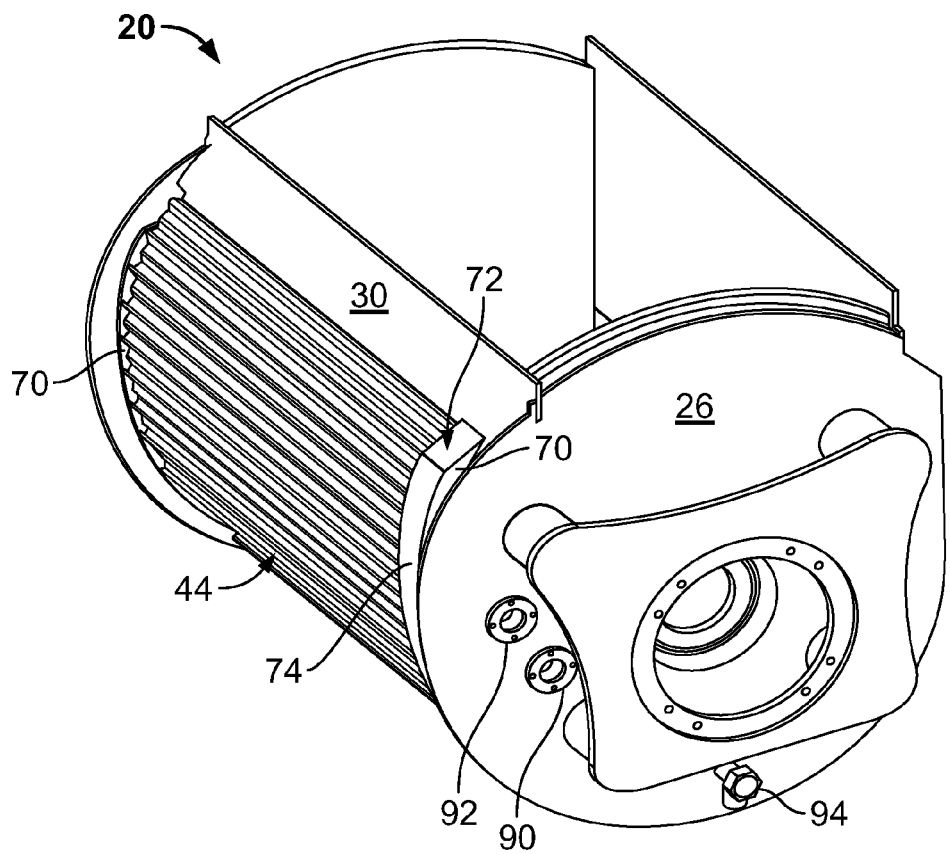
FIG. 4a is a perspective view of an exemplary embodiment of the bowl cooling jacket of the present invention showing the rear portion of the bowl cooling jacket attached to the rear portion of the bowl sheet.
Figure 4B:
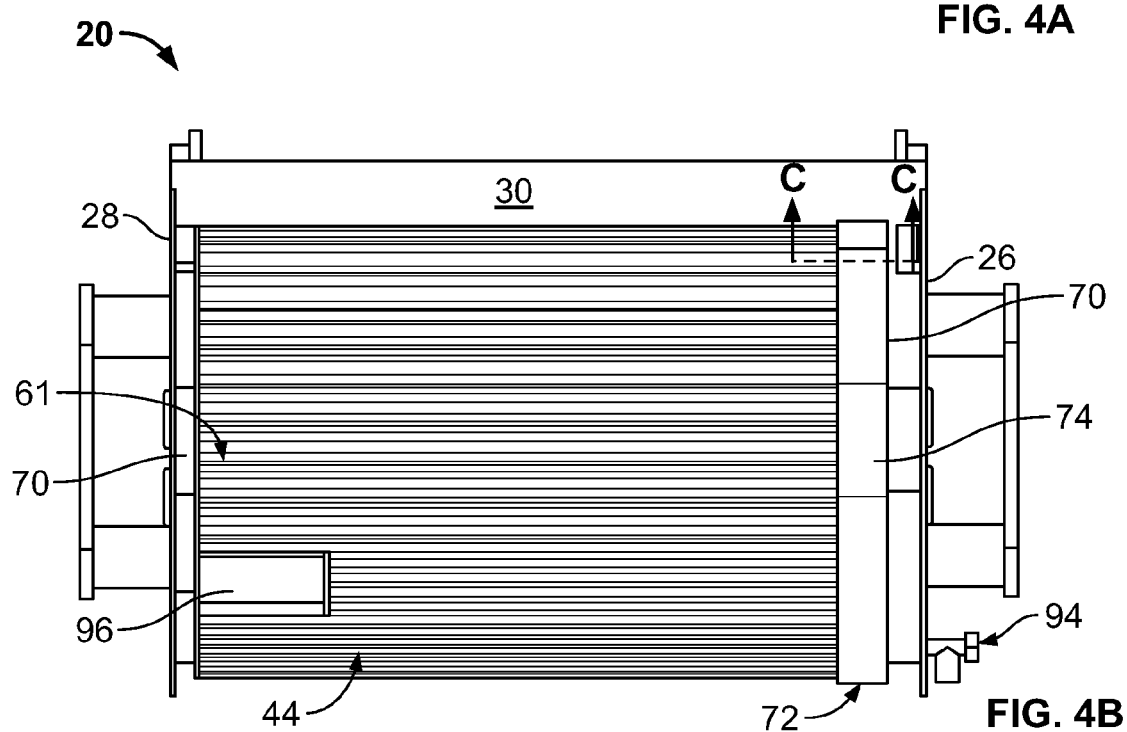
FIG. 4b is a side view of an exemplary embodiment of the bowl cooling jacket of the present invention showing the rear portion of the bowl cooling jacket attached to the front portion of the bowl sheet.
Figure 4C:
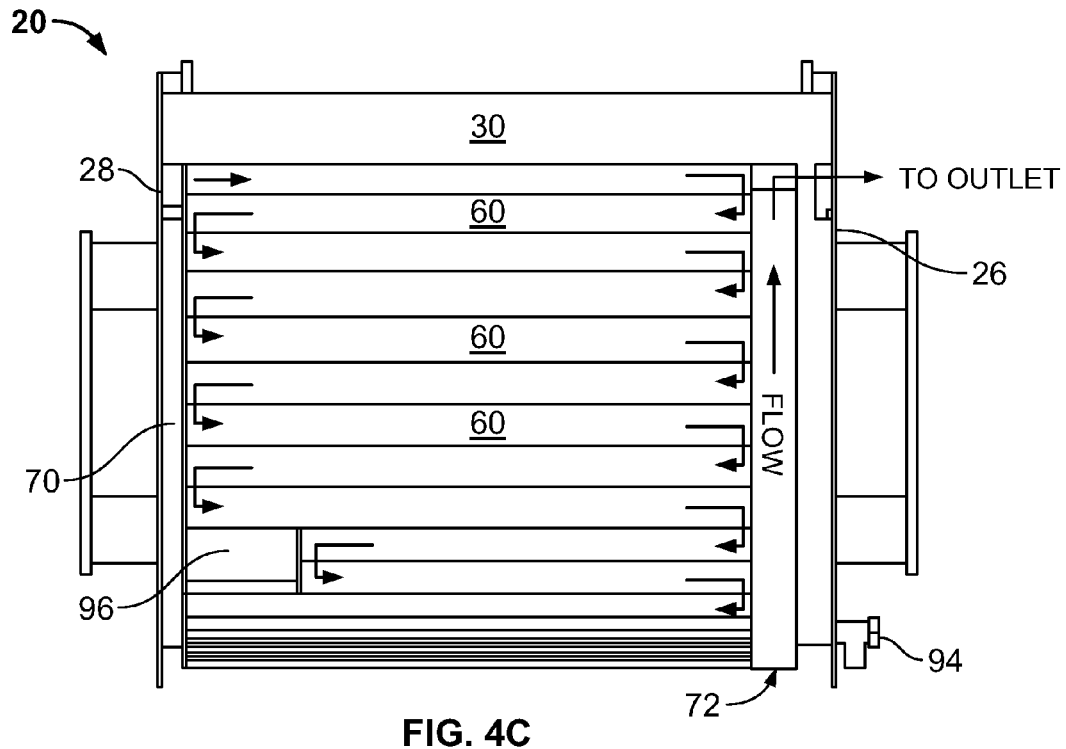
FIG. 4c is a side view of an exemplary embodiment of the bowl cooling jacket of the present invention showing the rear portion of the bowl cooling jacket with the top portions thereof removed to reveal individual coolant channels and to indicate the directional flow of liquid coolant through these channels.
Figure 4D:
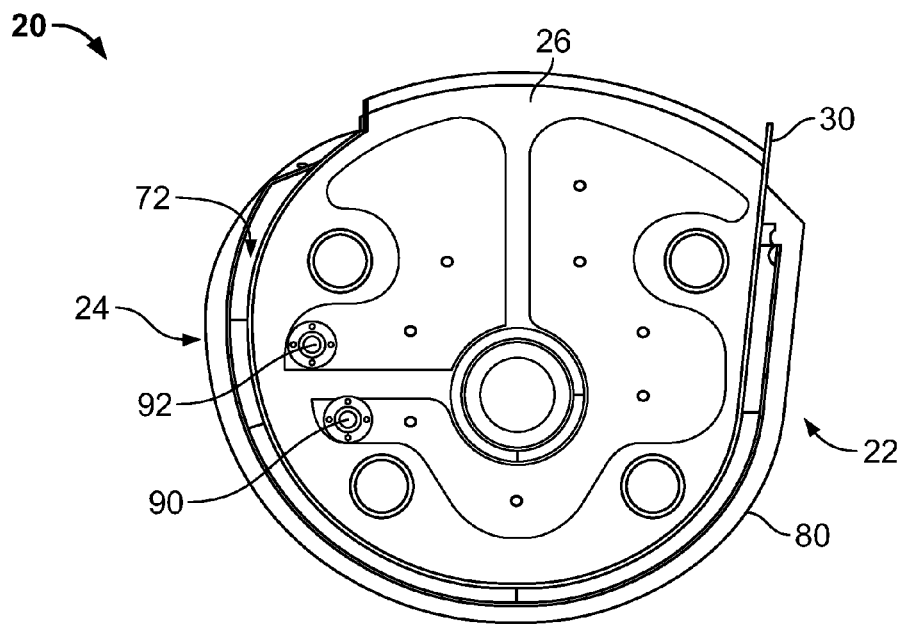
FIG. 4d is an end view of an exemplary embodiment of the mixing bowl of the present invention.
Figure 5:
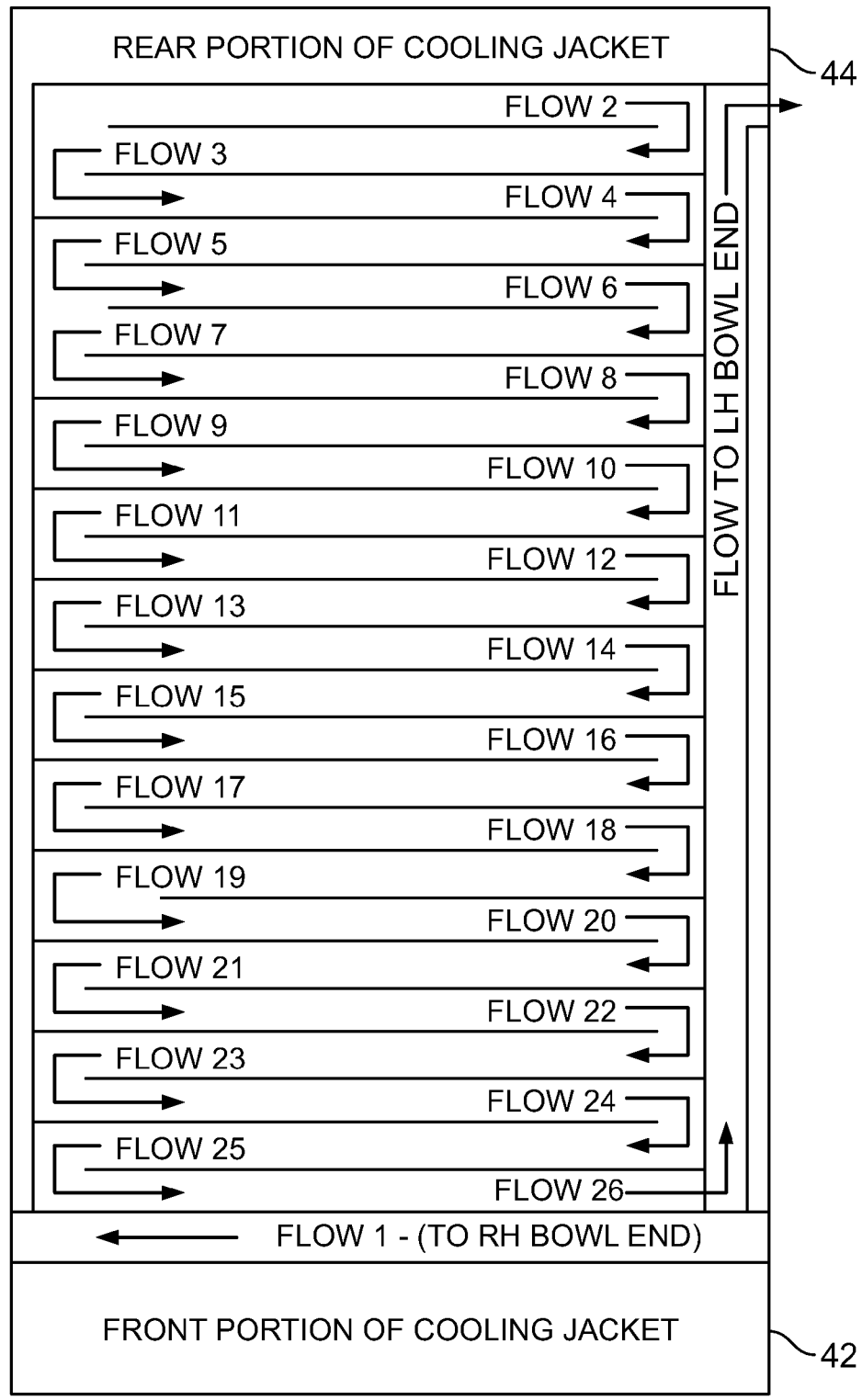
FIG. 5 is a schematic diagram showing the directional flow if liquid coolant through the bowl cooling jacket.
Figure 6A:
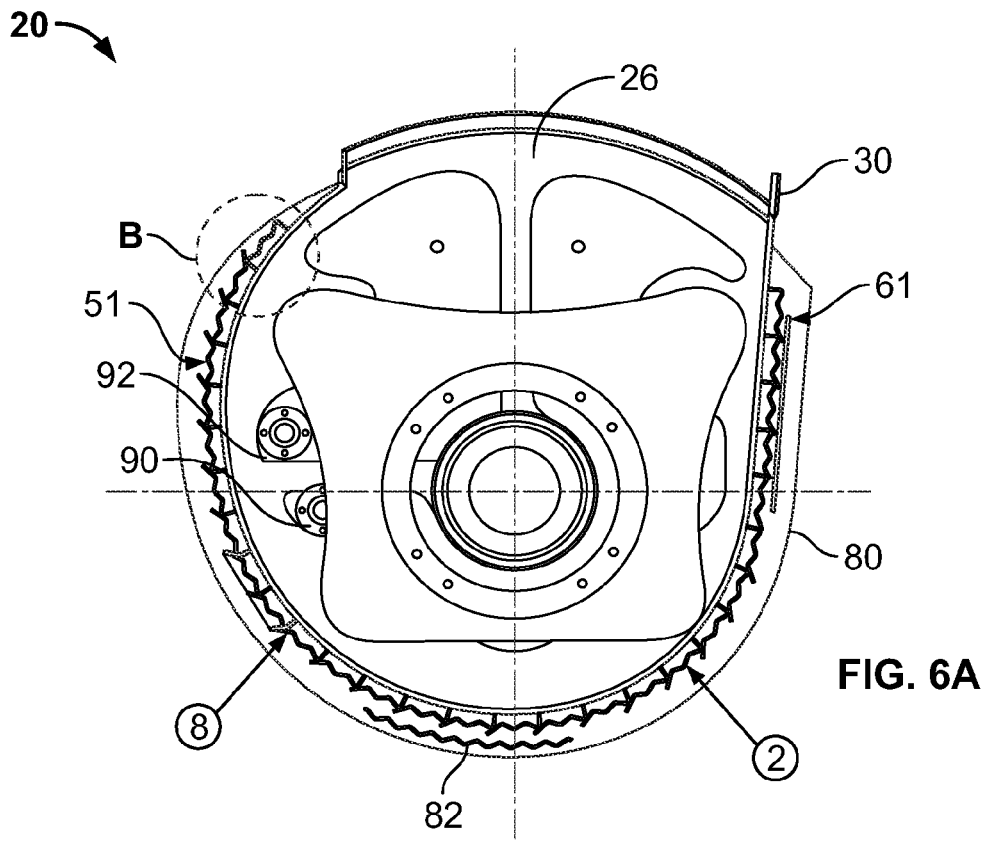
FIG. 6a is a cross-sectional view through one end of an exemplary embodiment of the bowl cooling jacket of the present invention showing the placement of channel forming structures on the bowl cooling sheet as well as the placement of the wrapper sheet on the exterior of the bowl cooling jacket.
Figure 6B:
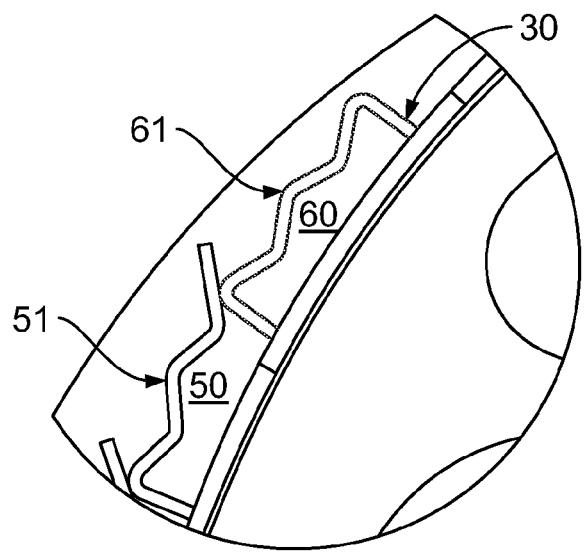
FIG. 6b is a detail of the bowl cooling jacket of FIG. 6a showing the geometry of the both the single break channels and the double break channels.

An optional bowl drain 94 may also be installed on either end of mixing bowl 20 (see FIGS. 4a and 4d) and a cutout for thermometer well 96 may be included in the rear portion 44 of bowl cooling jacket 40 (see FIGS. 4b-c). As shown in FIGS. 6a-b, wrapper sheet 80 is typically installed over channel forming structures 51 and 61 of bowl cooling jacket 40, and a quantity of insulating material 82 may be placed between the topmost surfaces of channel forming structures 51 and 61 and the inside surface of wrapper sheet 80.

Bowl cooling jacket 40 may be constructed using the following exemplary manufacturing method. This method is exemplary in nature and is not meant to be limiting in any way as other manufacturing methods are useful for constructing or assembling the bowl cooling jacket of the present invention. Following the mounting of bowl sheet 30 on mixing bowl 20, a series of visible marks are etched or otherwise scribed on the outer surface of bowl sheet 30 for use as guide lines. These guide lines facilitate proper placement of channel forming structures 51 and 61 on the surface of bowl sheet 30. Following the creation of the guide lines, jacket side rail 70 is welded onto the surface of bowl sheet 30 in an orientation generally perpendicular to the aforementioned guide lines (see FIGS. 3b and 4b). In an exemplary embodiment, jacket side rail 70 is a piece of sheet metal that has been laser cut to match the profile of bowl sheet 30. Jacket side rail 70 seals the ends of channel forming structures 51 and 61 to create sealed channels 50 and 60. Following this step and using the guide lines for proper placement, channel forming structures 51 (single-break) are individually welded to cooling jacket 40 beginning at rear portion 44 and ending on front portion 42. A double-break structure 61 is typically the final channel forming structure mounted on bowl sheet 30 (see FIG. 6a) for purposes of completing bowl cooling jacket 40. Following installation of channel forming structures 51 and 61, a second jacket side rail 70 is mounted on the opposite side of bowl sheet 30 such that both ends of the various channel forming structures are sealed. In this configuration, liquid coolant enters bowl cooling jacket 40 at rear portion 44. As will be appreciated by the skilled artisan, channel forming structures 51 and 61 are typically preformed from metal plates using a hydraulic brake or similar device. The actual number of channel forming structures (51, 61) mounted on bowl sheet 30 will vary based on conditions such as ambient air temperatures, dough ingredient temperatures, mixing speeds, and desired dough-out temperatures. Typically, the maximum number of channels possible (given space constraints) is mounted on bowl sheet 30 to provide maximum flexibility with regard to temperature control.

As discussed above, for certain applications it is desirable that refrigerant inlet port 90 and outlet port 92 be mounted on the same end of mixing bowl 20. Such a configuration may be achieved through the use of jacket return channel 72 (see FIG. 4b), which allows liquid coolant to enter bowl cooling jacket 40 at rear portion 44, flow from rear portion 44 to front portion 42, then flow from front portion 42 back to rear portion 44 (see FIGS. 3c and 4c). Jacket return channel 72 is typically constructed from two side by side jacket side rails 70 to which jacket return channel cover 74 has been welded to form a sealed channel. Following construction of the various channels on the surface of bowl sheet 30, pressure testing of bowl cooling jacket 40 is performed to identify leaks or other structural issues.

Figure 6C:
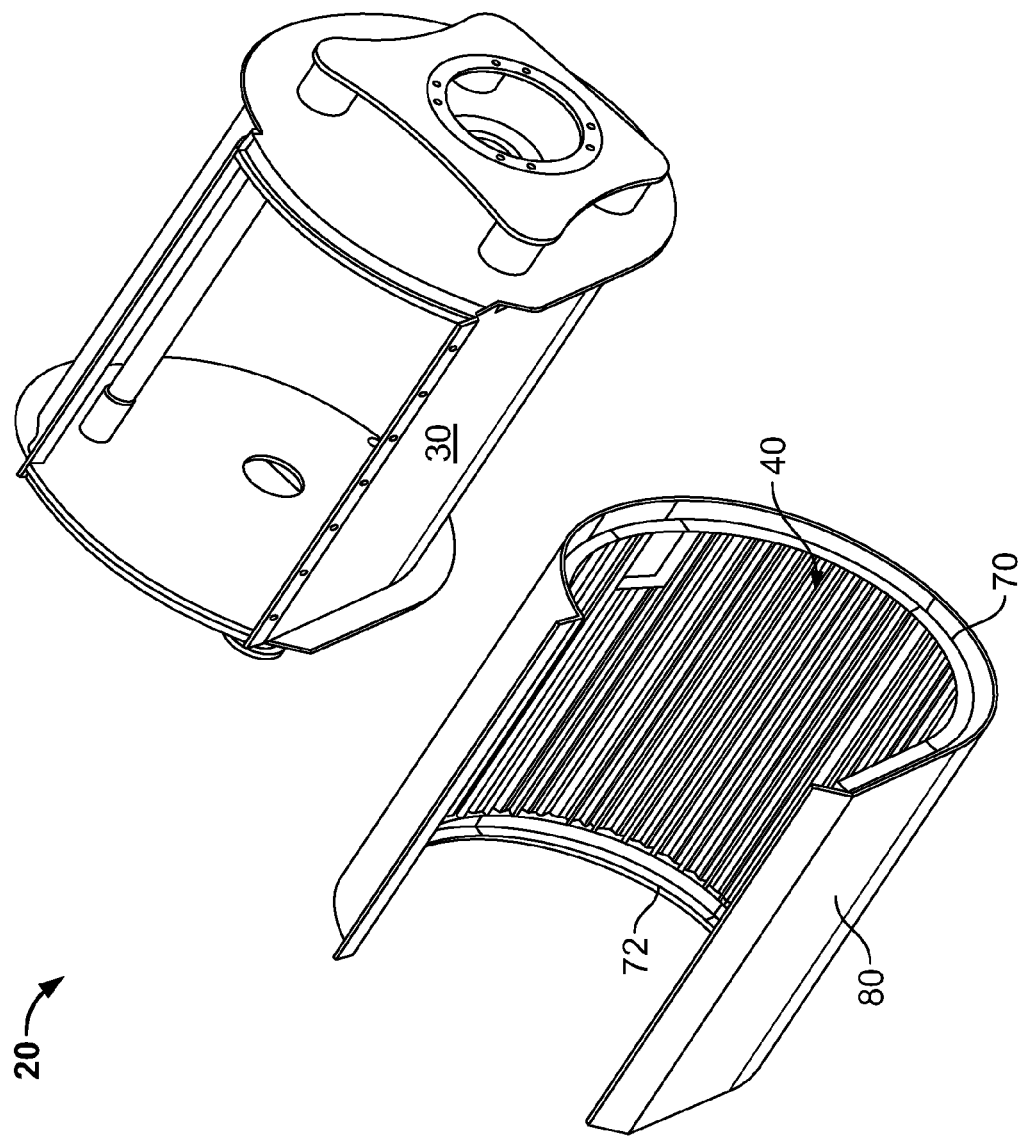
FIG. 6c provides an illustration of the mixing bowl component of the mixing apparatus of FIG. 1, wherein the wrapper sheet and channel forming structures have been removed from the bowl sheet.

As shown in FIGS. 6a-c, following the mounting of the various channel forming structures on bowl sheet 30, wrapper sheet 80 is welded onto mixing bowl 20. Wrapper sheet 80 provides a polished, aesthetically pleasing exterior surface to mixing bowl 20. As previously described, insulating material, such as foam insulation, may be placed between the outer surfaces of the various channel forming structures and the inner surface of wrapping sheet 80 to reduce the loss of the cooling effect to ambient air.

As previously discussed, the bowl cooling jacket of the present invention utilizes a configuration that differs from known cooling jackets, which are typically designed to maximize jacket stiffness for resisting dough forces experienced inside the mixing bowl during the mixing process. The use of a stiff or rigid cooling jacket often creates high stress regions in critical areas of the jacket thereby increasing the likelihood of weld cracks that may allow refrigerant to leak from the bowl cooling jacket. In contrast, the present invention includes a channel design that allows for the manufacture of a bowl cooling jacket possessing increased structural strength and fatigue resistance characteristics, while still maintaining sealed channel flow patterns for a liquid coolant. As shown in the Figures, each channel forming structure 51, 61 of bowl cooling jacket 40 includes multiple lengthwise breaks or bends 54, 55, 64, 65 formed therein for providing increased strength, flexibility, and fatigue resistance to bowl cooling jacket 40. Such performance characteristics are accomplished through the transfer of stress concentrations from weld (fastening) joints 56, 66 and bowl sheet 30, to the material that forms channels 50 and 60. The contoured profiles of channel forming structures 51 and 61 allow the entire bowl cooling jacket 40 to act as a "spring" rather than a highly rigid body. When multiple channel forming structures 51 and 61 are assembled into a complete bowl cooling jacket 40, the previously discussed bowl sheet deflections are absorbed by the contoured profiles of channel forming structures 51 and 61, while stress concentrations are directed to the bends (54, 55, 64, 65) formed along the length of channel forming structures 51 and 61 and not to weld joints 56 and 66 near the end of each channel 50 and 60. The formed, contoured material of channels 50 and 60 possesses a greater fatigue resistance than weld joints 56 and 66, thereby reducing the occurrence of fatigue failures and maintaining sealed channels for coolant passage. Thus, high stress areas are shifted from welded joints to the material of jacket channels and stress is distributed over a large number of channels; thereby increasing the integrity of the entire bowl cooling jacket.

Advantageously, the bowl cooling jacket of the present invention effectively manages dough forces generated during the dough mixing process while maintaining cooling jacket strength and cooling ability. As discussed, previously known channel designs force mixing stresses to concentrate near the end of weld seams, which can lead to fatigue cracking problems and the failure of a bowl cooling jacket. By utilizing a multi-break or multi-bend channel design, mixing stresses are moved off of weld seams and onto material break-lines. Thus, the present invention provides a bowl cooling jacket with greatly increased resistance to fatigue cracks over the life of a mixing apparatus.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A mixing system for use with viscous substances, comprising:
   (a) a mixing apparatus;
   (b) a mixing bowl mounted within the mixing apparatus, wherein the mixing bowl further includes:
      (i) a bowl sheet; and
      (ii) a flexible cooling jacket mounted on the bowl sheet, wherein the cooling jacket further includes a plurality of individual channel forming structures running parallel to one another across the length of the bowl sheet, wherein the channel forming structures are in fluid communication with one another, and wherein each of the channel forming structures further includes:
         (a) a least one substantially vertical portion, relative to the surface of the bowl sheet, wherein the at least one substantially vertical portion is welded at one end thereof to the bowl sheet at a weld joint; and
         (b) a substantially horizontal portion, relative to the surface of the bowl sheet, wherein each horizontal portion further includes a contoured region having a plurality of parallel ridges and parallel valleys formed therein and running lengthwise therethrough, and wherein the plurality of parallel ridges and parallel valleys are operative to provide increased strength, flexibility and fatigue resistance to the cooling jacket by transferring operational stresses from the weld joint to the material of the contoured region; and
   (c) a source of coolant, wherein the source of coolant is in fluid communication with the cooling jacket for reducing the temperature of a viscous substance being mixed in the mixing bowl.

2. The mixing apparatus of claim 1, wherein the mixing apparatus is adapted for use with flour-based dough.

3. The mixing apparatus of claim 1, wherein the cooling jacket is adapted for use with an indirect refrigeration system.

4. The mixing apparatus of claim 1, wherein the cooling jacket is adapted for use with a direct refrigeration system.

5. The mixing apparatus of claim 1, wherein the cooling jacket further includes at least one channel forming structure running perpendicular to the length of the bowl sheet, and wherein the at least one channel forming structure running perpendicular to the length of the bowl sheet is in fluid communication with the plurality of individual channel forming structures running parallel to one another across the length of the bowl sheet.

6. The mixing apparatus of claim 1, wherein each of the channel forming structures forms a sealed channel for receiving liquid coolant.

7. A mixing bowl for use with mixing systems, comprising:
   (a) a bowl sheet; and
   (b) a flexible cooling jacket mountable on the bowl sheet, wherein the cooling jacket further includes a plurality of channel forming structures running parallel to one another across the length of the bowl sheet, wherein the plurality of channel forming structures are in fluid communication with one another, and wherein each of the plurality of channel forming structures further includes:
      (a) a least one vertical portion relative to the surface of the bowl sheet, wherein the at least one vertical portion is welded at one end thereof to the bowl sheet at a weld joint; and
      (b) a horizontal portion relative to the surface of the bowl sheet, wherein each horizontal portion further includes a contoured region having a plurality of parallel ridges and parallel valleys formed therein and running lengthwise therethrough, and wherein the plurality of parallel ridges and parallel valleys are operative to provide increased strength, flexibility and fatigue resistance to the cooling jacket by transferring operational stresses from the weld joint to the material of the contoured region.

8. The mixing bowl of claim 7, wherein the cooling jacket is adapted to be in fluid communication with a source of liquid coolant.

9. The mixing bowl of claim 7, wherein the mixing bowl is adapted for use with flour-based dough.

10. The mixing bowl of claim 7, wherein the cooling jacket is adapted for use with an indirect refrigeration system.

11. The mixing bowl of claim 7, wherein the cooling jacket is adapted for use with a direct refrigeration system.

12. The mixing bowl of claim 7, wherein the cooling jacket further includes at least one channel forming structure running perpendicular to the length of the bowl sheet, and wherein the at least one channel forming structure running perpendicular to the length of the bowl sheet is in fluid communication with the plurality of channel forming structures running parallel to one another across the length of the bowl sheet.

13. The mixing bowl of claim 7, wherein each of the channel forming structures forms a sealed channel for receiving liquid coolant.

* * * * *